(12) United States Patent
Montague (10) Patent No.: US 12,391,335 B2
(45) Date of Patent: Aug. 19, 2025

(54) POWER UNIT AND ELECTRIC DRIVE SYSTEM FOR A BIKE

(71) Applicant: Swytch Technology LTD, London (GB)

(72) Inventor: Oliver Montague, Bristol (GB)

(73) Assignee: Swytch Technology LTD, London (GB)

( * ) Notice: Subject to any disclaimer, the term of this patent is extended or adjusted under 35 U.S.C. 154(b) by 1371 days.

(21) Appl. No.: 16/648,448

(22) PCT Filed: Sep. 18, 2018

(86) PCT No.: PCT/GB2018/052668
§ 371 (c)(1),
(2) Date: Mar. 18, 2020

(87) PCT Pub. No.: WO2019/058112
PCT Pub. Date: Mar. 28, 2019

(65) Prior Publication Data
US 2020/0231247 A1   Jul. 23, 2020

(30) Foreign Application Priority Data
Sep. 20, 2017   (GB) ...................................... 1715176

(51) Int. Cl.
*B62M 6/50*   (2010.01)
*B62H 5/00*   (2006.01)
(Continued)

(52) U.S. Cl.
CPC ............... *B62M 6/50* (2013.01); *B62H 5/001* (2013.01); *B62J 43/13* (2020.02); *B62J 43/30* (2020.02);
(Continued)

(58) Field of Classification Search
CPC . B62M 6/50; B62M 6/60; B62M 6/85; B62M 6/90; B62J 43/30; B62J 43/13;
(Continued)

(56) References Cited

U.S. PATENT DOCUMENTS 4,871,042 A    10/1989  Hsu et al.
5,491,390 A *   2/1996  McGreen .................. B62J 9/22
                                                                318/5
(Continued)

FOREIGN PATENT DOCUMENTS

CN     201009985 Y    1/2008
CN     202138454 U    2/2012
(Continued)

OTHER PUBLICATIONS

International Preliminary Report on Patentability for PCT Application No. PCT/GB2018/052668 dated Apr. 2, 2020.
(Continued)

*Primary Examiner* — Valentin Neacsu
*Assistant Examiner* — Michael R Stabley
(74) *Attorney, Agent, or Firm* — Harness, Dickey & Pierce, P.L.C.

(57) ABSTRACT

A power unit for powering an electric bike, the power unit comprising: a power supply; a control module connected to the power supply and configured to manage the power output by the power unit; a holder for supporting the power supply and control module; a power connector for connecting the power unit to an electric motor; a control connector for connecting the power unit to an input device; and an attachment device for attaching the power unit to a bike. An electric drive system for a bike, the system comprising: a separable power unit; an electric motor for powering a bike, wherein the electric motor is separably connectable to the power unit by means of the power connector; an input device for communicating data to the power unit; wherein the data is used to manage the power supply of the power unit and the input device is separably connectable to the power unit by means of the control connector.

17 Claims, 6 Drawing Sheets

(51) Int. Cl.
  *B62J 43/13*   (2020.01)
  *B62J 43/30*   (2020.01)
  *B60R 25/24*   (2013.01)
  *B62J 6/015*   (2020.01)
  *B62J 9/21*   (2020.01)
  *B62J 45/20*   (2020.01)
  *B62J 45/413*   (2020.01)
  *B62J 50/22*   (2020.01)
  *B62M 6/60*   (2010.01)
  *B62M 6/85*   (2010.01)

(52) U.S. Cl.
  CPC .............. *B60R 25/24* (2013.01); *B62J 6/015* (2020.02); *B62J 9/21* (2020.02); *B62J 45/20* (2020.02); *B62J 45/413* (2020.02); *B62J 50/22* (2020.02); *B62M 6/60* (2013.01); *B62M 6/85* (2013.01)

(58) Field of Classification Search
  CPC . B62J 45/20; B62J 6/015; B62J 45/413; B62J 9/21; B62J 50/22; B60R 25/24
  See application file for complete search history.

(56) References Cited

U.S. PATENT DOCUMENTS

| | | | | |
|---|---|---|---|---|
| 5,671,821 | A  * | 9/1997 | McGreen | B62M 6/75 |
| | | | | 310/90 |
| 6,155,369 | A  * | 12/2000 | Whittaker | B60L 50/66 |
| | | | | 180/207.3 |
| 7,117,966 | B2 * | 10/2006 | Kohda | B60L 53/80 |
| | | | | 180/68.5 |
| 8,413,947 | B2 * | 4/2013 | Chiang | H01M 50/244 |
| | | | | 206/703 |
| 8,651,212 | B2 * | 2/2014 | Vincenz | B62K 19/36 |
| | | | | 180/205.1 |
| 8,777,804 | B2 * | 7/2014 | Takachi | B62M 25/08 |
| | | | | 477/3 |
| 8,875,550 | B1 | 11/2014 | Spunt et al. | |
| 9,061,731 | B1 * | 6/2015 | Do | B62M 6/85 |
| 9,914,501 | B2 * | 3/2018 | Marioni | B60L 50/20 |
| 10,005,518 | B2 * | 6/2018 | Guida | B62M 6/40 |
| 2011/0240391 | A1 * | 10/2011 | Bonneville | B60L 50/52 |
| | | | | 180/220 |
| 2012/0109436 | A1 | 5/2012 | Saida | |
| 2013/0257346 | A1 | 10/2013 | Jakins et al. | |
| 2013/0267376 | A1 | 10/2013 | Takachi | |
| 2013/0311020 | A1 * | 11/2013 | Searles | F16M 13/022 |
| | | | | 701/22 |
| 2015/0158551 | A1 | 6/2015 | Ogawa | |
| 2015/0266543 | A1 * | 9/2015 | Marioni | B60L 50/51 |
| | | | | 180/207.3 |
| 2016/0075226 | A1 * | 3/2016 | Biderman | B60L 50/20 |
| | | | | 301/6.5 |

FOREIGN PATENT DOCUMENTS

| | | | | |
|---|---|---|---|---|
| CN | 202499232 U | 10/2012 | | |
| CN | 202499253 U | 10/2012 | | |
| CN | 202737011 U | 2/2013 | | |
| CN | 202953074 U | 5/2013 | | |
| CN | 104276252 A | 1/2015 | | |
| CN | 104411575 A | 3/2015 | | |
| CN | 205059925 U | 3/2016 | | |
| CN | 205960061 U | 2/2017 | | |
| DE | 102011050613 A1 | 11/2012 | | |
| DE | 212011100138 U1 * | 6/2013 | .............. | B60L 8/003 |
| EP | 2988345 A1 | 2/2016 | | |
| JP | 2001-115717 A | 4/2001 | | |
| KR | 10-2011-0043975 A | 4/2011 | | |
| KR | 10-2015-0134769 A | 12/2015 | | |
| KR | 10-2015-0139708 A | 12/2015 | | |
| TW | M458338 U | 8/2013 | | |
| WO | WO-2014/002141 A1 | 1/2014 | | |

OTHER PUBLICATIONS

Swytch Bike facebook page, retrieved at: https://www.facebook.com/swytchbike/.

Swytch Bike twitter page, retrieved at: https://twitter.com/SwytchBike.

International Search Report dated Nov. 29, 2018, issued in corresponding PCT Application No. PCT/GB2018/052668.

Calibike: "48V15T Electric Bicyle ebike 48V 15AH Lithium Triangle Pack Battery and Charger 1 YR Warranty Calibike" Aug. 2017, retreived from the internet Nov. 20, 2020 at https://web.archive.org/web/2017082020 2938/https://calibike.com/product/48v15t-e lectric-bicycle-ebike-48v-15ah-lithium-tri angle-pack-battery-and-charger-1-yr-warran ty/.

Hilltopper Electric Bike Company: "Hilltopper Electric Bike Kit 3 Minute Installation" Jun. 2015, retreived from the internet Nov. 21, 2018, at https://www.youtube.com/watch?time -continue=82&v= QLLzOVtNwcM.

AuthenTech—Ben Schmanke: "Easy + Cheap eBike!! Motorized Wheel Conversion Kit Review" Jun. 2017, retreived from the internet Nov. 21, 2018 at https://www.youtube.com/watch?v= zyS08u hwvi4.

"ARCC Moulton TSR. E2-pod Intelligent Power," ARCC Innovations. Undated brochure, Downloaded from https://arccinnovations.com/userfiles/Manuals/MoultonBrochure150917ForPrint.pdf.

"ARCC e2 pod," ARCC Facebook page, post dated Feb. 23, 2016, https ://www.facebook.com/arccinnovations/ Screen shot taken Jun. 18, 2018.

Examination Report for Great Britain Application No. GB1715176.2 dated Dec. 22, 2021.

Search Report for Great Britain Application No. 1715176.2 dated Jun. 19, 2018.

Communication Pursuant to Article 94(3) EPC issued Sep. 6, 2023 in European Patent Application No. 18778975.5.

Communication Pursuant to Rule 114(2) EPC issued Feb. 12, 2024 in European Patent Application No. 18778975.5.

* cited by examiner

POWER UNIT AND ELECTRIC DRIVE SYSTEM FOR A BIKE

This application is a national phase under 35 U.S.C. § 371 of PCT International Application No. PCT/GB2018/052668, which has an International filing date of Sep. 18, 2018, which claims priority to GBSN Application No. 1715176.2, filed Sep. 20, 2017, the entire contents of each of which are hereby incorporated by reference.

FIELD

Embodiments described herein relate to systems, devices and methods for providing electrically powered bikes.

BACKGROUND

The demand for push bikes—traditionally powered by human activity—to have an option for being powered electrically is increasing. Traditionally, bikes are manufactured either to have the option to use electric power to power the bike, or not.

There are few options available for converting a bike not originally manufactured to be electrically powered into one that is capable of being electrically powered. Where such systems are available, they traditionally involve significant modification to the bike.

Such modifications may involve the installation of an electric motor for driving the bike, the installation of sensors to monitor attributes relating to the bike and user, the attachment of supports for holding the battery, the calibration and fitting of a control module for controlling the system and the routing of significant amounts of wiring connecting all of the components of the electric power system, which are traditionally located at a number of spaced locations around the bike. Given the extent of modification traditionally required, they are often expensive and irreversibly alter the character of the bike, even when electric power is not required. This prevents the widespread modification of bikes to be electrically powered.

It would be desirable for a system to be provided which allows bikes to be adapted to be electrically powered at a low cost and convenience, with minimal modification being required of the underlying bike, thus allowing the bike to be used in an electrically powered and non-electrically powered state.

SUMMARY OF INVENTION

The present embodiments primarily relate to bikes; however, it will be understood that such systems may equally be applied to tricycles, scooters and other similar items. As such, any reference to bike, or a power unit suitable for powering a bike is understood to cover uses with bikes and other items which may be powered in a similar manner and/or requiring similar levels of power as a push bike.

According to an embodiment of the present disclosure an electric drive system is provided for a bike, the system comprising:
 a separable power unit as described anywhere herein;
 an electric motor for powering a bike, wherein the electric motor is separably connectable to the power unit by means of the power connector;
 an input device for communicating data to the power unit;
 wherein the data is used to manage the power supply of the power unit and the input device is separably connectable to the power unit by means of the control connector.

The electric drive system for a bike provides a means by which a user can electrically drive their bike. A user may attach an electric motor and input device to a standard, non-electric bike. The separable power unit, as described below, can then be attached to the bike and connected to the input device and the electric motor. The bike can then be electrically powered.

The motor may comprise any motor for powering a bike. The motor may be a hub motor for mounting on the hub of a bike wheel. The motor may be a mid-drive motor, for mounting around the pedal crank. The motor may be geared, or gearless. The motor may be a 250 W, 500 W or 1000 W-rated motor.

The motor may be powered by DC power. The motor may comprise a solid state electronics switching circuit. The motor may be configured to be powered by asynchronous AC power.

The electric drive system may comprise a motor connector for connecting the motor to the power unit (or the power connector of the power unit). A motor connector may facilitate connecting the power unit to the motor. The motor connector may comprise a power cable and an associated male/female connector head. The motor connector may be conveniently located for connection with a power connector of the power unit. The power cable may be attached to, or integral with members of the bike frame. A motor connector may be compatible with a power connector of the power unit (discussed below) and so may be of the same type.

The motor connector may be for connecting the motor to the power connector of the power unit. For example, the power connector of the power unit may comprise a standard 12V DC power socket. The motor connector, connected to the motor, may comprise a cable and a 12V DC plug, arranged to be inserted into the power connector of the power unit, thus connecting the motor to the power unit.

An input device may comprise an electronic device configured to communicate data with the power unit. The data communicated with the power unit may be used to determine, if—and how much—power the electric motor should output. This may be achieved by controlling the amount of power output by the power unit to the motor.

The electric drive system may comprise an input device connector for connecting the input device to the power unit (or the control connector of the power unit). An input device connector may facilitate connecting the input device to the power unit. The input device connector may comprise a power and/or data cable and an associated male/female connector head. The power/data cable may be attached to, or integral with members of the bike frame. An input device connector may be compatible with the control connector of the power unit (discussed below) and so may be of the same type.

The input device connector may be for connecting the input device to the control connector of the power unit. For example, the control connector of the power unit may comprise a standard USB input/output port. The input device connector, connected to the input device, may comprise a data cable integral with a USB male connector, arranged to be inserted into the control connector of the power unit, thus connecting the input device to the power unit. Alternatively, the control connector and input device connectors may both comprise wireless transceivers.

The electric drive system for a bike may comprise only one, or a plurality of input devices, each with corresponding input device connectors connectable to control connectors of the power unit.

A power unit may provide power and control for the electric drive system for a bike.

According to a further embodiment is a power unit for powering an electric bike, the power unit comprising:
a power supply;
a control module connected to the power supply and configured to manage the power output by the power unit;
a holder for supporting the power supply and control module;
a power connector for connecting the power unit to an electric motor;
a control connector for connecting an input device to the power unit;
an attachment device for attaching the power unit to a bike.

The power unit may be a discrete, portable module. The power unit may be attachable to and detachable from a push-bike or a bike-mounted electric drive system. The power unit is therefore separable and can be connected and disconnected by a user—both mechanically and electrically, optionally in a single motion. The power unit may be portable such that it can be carried by a user, for example with one hand or in a rucksack. The power unit may be a portable electric bike power and control unit.

A user may carry the power unit to a bike, attach the power unit to the bike—for example on the handlebars—by means of the attachment device and connect the power connector and control connector to the rest of the electric drive system for a bike, such that power can be supplied from the power supply to the electric motor and the control module of the power unit can communicate with the input device (e.g. a sensor or user device) on the bike in order to manage the power supply.

Accordingly, the electric drive system for a bike allows a non-electric bike to be easily used as an electric bike when desired with only minimal modifications (e.g. attaching an electric motor and a pedal sensor).

A bike, once modified, can be used as both an electric bike or a normal non-electric bike. The electric motor provides little or no resistance when not in use and, as such, the use of the bike in a non-electric mode is hardly affected by the presence of the electric drive system.

The power supply may be a battery. The power supply may be a rechargeable battery. The power supply may be suitable for powering an electric bike and may be configured to connect to an electric motor, for example an electric motor located on the hub of a bike wheel. The power supply may be for providing power at 24V, 36V, 48V or any other voltage.

The electric drive system may comprise cabling to connect features of the system. All of the cables may be suitable for transmitting power and/or data. All of the cables of the system may be suitable for transmitting at 24V, 36V or 48V.

The control module may be configured to manage the electrical power output by the power supply/the power unit, and/or the power output of an electric motor attached to the bike. The control module may be configured to manage the power supply. The control module may be configured to manage the power supplied to the power connector.

The control module may comprise a processor and data storage. The data storage may store computer executable instructions, wherein the processor may be configured to, when executing the instructions, control the power supply.

The control module may comprise solid state electronics. The control module may comprise, or consist of, power electronics. Accordingly, the control module may be configured to control the power output of the power unit (to an electric motor) using solid state electronics.

The control module may comprise the charge interface (discussed in detail below) to facilitate charging of the power unit, i.e. power supply. The charge interface may be configured to allow the power supply to be charged from a mains power or DC power connector.

The control module may be configured to receive data from an input device, or from multiple input devices via the control connector(s) of the power unit. The control module may be configured to control the power unit such that power is supplied to the electric motor, or power is stopped from being supplied to the electric motor. The control module may vary the power output from the power supply, the power unit and/or electric motor, depending on the data received from the input device(s) via the control connector(s). The control module may determine if, or how much, power the electric motor outputs to power the bike and may therefore control the speed of the bike. The control module may be configured to vary the power output based on data received from a single, or multiple, input devices.

The power supply and control module may both be located inside the holder. The power supply and control module may be entirely contained within the holder. The holder may protect the power supply and control module from damage from moisture or impact. The holder may facilitate easy transportation of the power supply and control module and easy connection of the power unit to a bike-mounted electric power system.

The holder may support, hold and/or contain the control module and power supply such that the control module and power supply can be conveniently handled using the holder.

The holder may be a case. The holder may be a bag. The holder may be made out of fabric. The holder may comprise a waterproof material.

The control module and power supply may be contained within a case or bag such that they can be easily carried.

The power supply may be for carrying by the user while it is powering the bike. For example, the power supply may be placed into the bag or a backpack and connected via a retractable cable, such as a "Magsafe"® style cable.

The holder may have a front, back, top, bottom and two sides. A top surface of the holder may be angled so that it faces a user when attached to the handlebars of a bike.

The holder may comprise a refastenable opening to permit access to the inside of the holder. The top of the holder may comprise an opening which can be opened and refastened using fasteners, for example a poppers or a zip.

A surface of the holder may comprise a transparent material, to allow a user to view the contents of the holder. The top of the holder may comprise a transparent material.

One surface of the holder may be provided such that it can present branding information to a user of the bike.

The power unit may comprise a handle. The holder may comprise a handle. The holder may comprise a carrying strap.

The holder may comprise a storage portion for holding a mobile phone. The holder may be a bag and a portion of the bag may be reserved for storage. The storage portion of the holder may be large enough to carry any or all of the following: a phone, laptop, water, wallet, purse, keys or battery charger. The storage portion may comprise a transparent window or surface to allow a user to view the contents of the storage portion (e.g. a mobile phone) while riding the bike.

The power connector may be configured to be a power output from the power unit to the electric motor of the electric drive system. The power connector may be configured to connect to the motor connector, which may be mounted on a bike. The power connector and motor connector may be any type of known connector suitable for transmitting DC or AC power at a voltage and power level suitable for powering an electric motor for a bike.

The power connector may comprise a cable attached to a male/female connector head.

The power connector may be located in the holder. The power connector may be fixed or integral with the holder on an outer surface thereof, to permit a user access to the power connector. Alternatively, the power connector may be separately manoeuvrable with respect to the holder, to allow a user to position the power connector in a location suitable for connection to a motor connector.

The power connector may be recessed with respect to a surface of the holder, such that the power connector is protected and cannot be accidentally touched during transport or installation of the power unit.

The power connector may instead be integral with the attachment device and arranged to automatically connect with the motor connector as the attachment device is connected with a mount of the electric drive system (i.e. an attachment device located on a bike).

The control connector may be located in the holder. The control connector may be fixed or integral with the holder on an outer surface thereof, to permit a user access to the control connector. The control connector may be located to conveniently be connected with the input device connector, which may be fixed relative to the bike. Alternatively, the control connector may be separately manoeuvrable with respect to the holder, to allow a user to position the control connector in a location suitable for connection to the input device connector of the bike-mounted electric power system, or to a connector of a further device.

The control connector may be recessed with respect to a surface of the holder to prevent them accidentally being touched during transport.

A control connector may be configured for power/data communication with an input device. The control connector may be connectable and disconnectable with an input device connector (which is connected to, or integral with, the input device). The input device may be part of a bike-mounted electric power system. The control connector may be for providing a data connection between the power unit and a bike-mounted electric power system or a user device. The control connector may therefore be for receiving data from an input device or user device. The control connector may alternative/additionally be for transmitting data and/or power to a bike-mounted electric power system or user device. The control connector may be a power or data input to the power unit, or a power or data output from the power unit, or both.

The power connector may comprise a cable attached to a male/female connector head.

The power unit may comprise one, or a plurality of, control connectors. The comments made herein with respect to "a", or "the", control connector may apply to one, some of, or each of the control connectors.

It is to be understood that a power unit may comprise a single control connector for connection to a plurality of input devices. Equally a single input device connector may service a plurality of input devices.

Indeed, a power unit may comprise a single connector which serves as both a (or many) control connector and a power connector. The control connector and power connector may be the same physical feature.

The control connector(s) and power connector(s) may be combined in a single universal connector. The attachment device may comprise the single unitary connector.

Equally, the motor connector and an (or many) input device connector may be provided by the same connector (i.e. one single physical feature).

The motor connector (or a part thereof) and the input device connector (or a part thereof) may be combined into a single connector.

The single connector, or one or both of the two connectors, could be a new or known form of connector. For example it could be custom for this product, or something more frequently used and familiar to users of hand held electrical appliances, such as a MagSafe® style connector.

The single connector for the motor connector and input device connector may be in the mount. The mount may comprise a single electrical connector, comprising (parts of) both the motor connector and input device connector.

The mount's single electrical connector may be arranged to connect to the attachment device's single unitary connector. These connectors may be arranged to connect as the attachment device and mount engage.

The control connector may be connected (directly or indirectly) to the control module. The control module may use the data received via the control connectors in order to manage the power supply of the power unit and/or electric motor. The power unit may also transmit data and/or power to an input device of the electric power system or a user device using the control connectors.

The electric drive system for a bike may comprise only one, or a plurality of input devices. Where "a", or "the", input device is described, it is to be understood that the comments apply, mutatis mutandis to one, some of, or each input device.

The input device may comprise, or be connected to, an input device connector. The input device connector may comprise a length of cable to connect the input device (which may be located at a first location on the bike) to the control connector (which may be located at a second location on the bike). The cable may be attached to, or integral with a member of the bike frame. The control connector may be connectable to an input device connector.

The control connector may be configured to receive input data from an input device. This data may be sent to the control module. The input data may determine the output state of the power unit. For example, if input data is provided which indicates that a user is not pedalling, no power may be output by the power unit. If, on the other hand, the input data indicates that a user is pedalling, the control module may manage the power supply such that the power unit outputs power to an electric motor, which powers the bike.

The input data may simply be a binary-type electric power level, suitable for indicating whether a user is pedalling or not. Alternatively, the input data may be more complex, including desired output power levels.

The power unit may comprise only a single control connector, for connecting the power unit to an input device. This control connector may be configured to connect (directly or indirectly) to an input device of the electric drive system. The electric drive system may comprise only a single input device. This input device may be a pedal sensor. The control connector may be configured to receive data from the pedal sensor. This data may then be transferred to the control module.

Alternatively, a pedal sensor may be included as one of a plurality of input devices.

The pedal sensor may be configured to detect when a user is pedalling. The pedal sensor may detect when a user is exerting pressure on a pedal, when a torque is being exerted on a pedal crank, and/or when the pedal crank is rotating. The pedal sensor may be configured to transmit this information to the control module, via the control connector. The control module may be configured to control the power unit and/or electric motor such that power is supplied to an electric motor and the electric motor powers the bike when a user is pedalling.

The electric drive system may comprise a plurality of input devices. The electric drive system may comprise a plurality of input device connectors. The power unit may comprise a plurality of control connectors. The power unit may comprise a control connector and the electric drive system may comprise an input device connector for each input device.

The electric drive system may comprise at least one of (i.e. one of, or a plurality of) the following input devices: a user interface, a pedal sensor, a brake sensor, a light, a user device, a throttle control, a light sensor.

The power unit may comprise control connectors for connecting the power unit to at least one, or two, of the following input devices: a user interface, a pedal sensor, a brake sensor, a light, a user device, a throttle control, a light sensor.

The input device may be a brake sensor for detecting when a brake is activated. The electric drive system may comprise a brake sensor for each brake. The electric drive system may comprise a single brake sensor for all of the brakes—the brake sensor may be configured to indicate when any of the brakes are activated. A control connector may be configured to connect a brake sensor to the power unit. The control connector may be configured to receive data from a brake sensor.

A brake sensor may be configured to detect when a user is using the brakes. The brake sensor may be configured to transmit this information to the control module of the power unit, via a control connector. The control module may be configured to control the power unit/supply and/or electric motor such that the electric motor reduces the output power when the brakes are being applied.

The input device may be a light. A control connector may be configured to connect a light to the power unit, such that the control module receives data regarding whether a light is on or off. The control connector may be configured to have the power unit transmit power to a light in order to power the light.

The input device may be a user device, such as a mobile phone, laptop, tablet, game device or other multimedia device. A control connector may be configured to connect a user device to the power unit, such that the control module can communicate data with a user device, such as a mobile phone or multimedia device.

The power unit may control an output device such as speakers. The speakers and power unit may be configured to play music selected by a user device.

The electric drive system may comprise a user interface. The input device may be a user interface. The user interface may therefore be part of the electric drive system and may be separably connectable to the power unit via a control connector. A control connector may be configured to connect a user interface to the control module and thus allow data to be communicated between the user interface and the control module. The user interface may be powered by the power unit. A control connector may therefore be configured to provide power to the user interface.

The power unit may comprise a user interface. The user interface may be connected to the control module. The user interface may be integral with the power unit and may be directly connected to the control module. The user interface may be integral with the holder. The user interface may be integral with a top surface of the holder, which is visible when the power unit is connected to a bike.

The user interface may comprise a processor and data storage. The data storage may store computer executable instructions, wherein the processor may be configured to, when executing the instructions, provide instructions to the control module. The instructions provided to the control module may be used to control the power output of the power unit, or undertake other actions as detailed below.

The user interface may comprise a display. The user interface may comprise a speaker. The user interface may comprise an input device for receiving inputs from a user.

The user interface may be configured to allow a user to turn the power unit on or power up/activate the electric drive system.

The user interface may comprise a touch screen.

The user interface and control module may be configured to allow a user to control the throttle i.e. control the power provided by the power unit and/or the power output of the electric motor. The user interface may be configured to allow a user to adjust the assistance provided by the electric drive system, i.e. the user interface may be configured to control or attenuate the power output of the motor. The user interface may provide power coefficients to the control module to manage the power output of the motor.

The user interface may allow a user to activate a light connected to the electric drive system. The user interface may allow a user to control a user device connected to the electric drive system (e.g. a mobile phone or other multimedia device).

The user interface may also provide feedback to the user, for example the speed of the bike, or the RPM of the electric motor. The user interface may provide a battery energy display, which informs the user on how much battery power is remaining, for example in terms of a percentage, distance or time.

The user interface and control module may be configured to allow a user to turn on a light on the bike, using the user interface.

The input device may be a throttle control, configured to control a power output of the power supply, power unit or electric motor. The control connector may be configured to connect a throttle control to the control module. The throttle control may be used to manage a maximum power output of the power unit and/or electric motor.

A throttle control may be implemented as part of a user interface, a user device (for example via a downloadable app) or a sensor. For example, the pedal sensor may be configured to act as a throttle control, by being configured to provide a plurality of different inputs to the power unit which correspond to a desired power unit output power (and hence an electric motor output power).

The input device may be a light sensor configured to detect an ambient light level. The control connector may be configured to connect a light sensor to the control module. The light sensor may be a photodiode configured with the control module to automatically turn on a light on the bike when low light level is detected, or such a photodiode might be an additional component with its own control system for that purpose.

One, some of, or each of the control connectors and input device connectors may be a wired connector for providing a wired connection. A wired connection may comprise any standard electrical connection suitable for providing an electrical or data connection (e.g. a USB connection). Accordingly, the control connector may be of any type suitable for transmitting data (and/or power), for example a USB or micro USB connector.

The, or each, control connector may be a male or female-type connector.

One, some of, or each of the control connectors and input device connectors may instead be a wireless connector for providing a wireless connection. A wireless connection may be provided by any standard system suitable for wireless data communication (e.g. NFC, Bluetooth™, BLE, ANT, etc. . . . ).

Accordingly, a control connector may comprise a wireless transceiver, configured to communicate with a wireless transceiver of an input device, or input device connector. Suitable types of wireless transceivers are known in the art. Examples include IR based products and RF based products. The transceivers may be configured such that the range of transmission is local to the bike, e.g. with a maximum range of 1 m 2 m, or 3 m, in order to ensure that transmission cannot occur between electric drive systems on neighbouring bikes. The transceivers likewise, or additionally, could be configured to communicate with cars or other vehicles, driverless or otherwise, for assisting the vehicles or their drivers in detecting the cyclist.

Naturally, where it is stated that power or control connectors are for connecting the power unit to an item—e.g. electric motor, sensor . . . —this does not necessarily imply a direct connection or a connection without intermediary. It merely means that they are directly or indirectly connected such that power and/or data can be communicated between the power unit and the item.

The attachment device may be configured to attach the power unit to the bike, e.g. the handlebars, frame, seat pole/post, a rack or a pannier bracket of a bike. The attachment device may comprise a clamp, locking mechanism and/or screw connection. The attachment may alternatively comprise a bayonet-type mount, a quick-release mechanism, a fastener, an elasticated mechanism, a tapered member, a magnetic/electromagnetic attachment mechanism which may be powered by a or the battery, a hook and loop fastener (e.g. Velcro®) or a suction/vacuum style clamp. The latter is known from fields such as satnavs, where the satnav is to be attached to a windscreen, or other fields for attachment to glass or bathroom walls, i.e. tiles. The attachment device may comprise a locking mechanism to prevent the attachment mechanism being unintentionally disconnected from the bike.

The attachment device may be configured to locate and support the power unit on a bike. The attachment device may be configured to lock the power unit physically in place. The attachment device may be configured to attach the power unit to the bike in a single step, e.g. a single user action.

The attachment device may comprise a locking mechanism, whereby the holder is secured to the bike. The locking mechanism may comprise a biased member and receiving recess. The attachment device may comprise a release configured to be actuated to unlock the locking mechanism so that the attachment mechanism can be detached from a bike. The release may move a biased member against the bias in order to unlock the attachment device. The holder may comprise a handle. The handle may be configured to actuate the release when it is moved. As such, moving the handle may actuate the release and unlock the locking mechanism. Accordingly, the attachment device may be unlocked when a user pulls on the handle. The handle may also be used to remove the bag from the bike. As such, the attachment device may be removed in a single user action, for example pulling the handle of the holder away from the bike.

The electric drive system may comprise a mount. The mount may be attachable to a bike. The mount may be configured to attach to the handlebars, frame, or a pannier bracket of a bike. The mount may comprise a clamp, locking mechanism and/or a screw connection for attaching to the bike.

The mount may be configured to cooperate with and/or engage the attachment device of the power unit, in order to support the attachment device and hence attach the power unit to the mount (and thus a bike). The mount and attachment mechanism may be configured to be mutually releasably engageable, to mechanically connect the mount and attachment mechanism. The attachment mechanism may therefore be configured to releasably engage the mount to secure the power unit relative to the electric drive system, and hence bike.

One of the attachment device and mount may comprise a mechanical connector arranged to cooperate with a corresponding mechanical connector on the other of the attachment device and mount. The mechanical connectors may comprise an internal and external helical thread, a slot and mating protrusion or any other mechanical locking feature. One of the attachment device and mount may comprise a male mechanical connector and the other may comprise a female mechanical connector. The mechanical connectors of the attachment device and/or mount may be biased (e.g. spring loaded).

The mount may be configured to locate and support the attachment device of a power unit on a bike. The mount may be configured to lock the power unit physically in place.

The motor connector may be integral with the mount.

The mount and motor connector may be arranged such that the motor connector is (automatically) connected to the power connector as the mount and attachment device engage. The mount and motor connector may be arranged such that the motor connector is (automatically) disconnected from the power connector as the mount and attachment device disengage.

The motor connector may be recessed with respect to a surface of the mount, such that the motor connector is protected and cannot be accidentally touched during transport or installation of the mount.

The power connector may be integral with the attachment device.

The attachment device and power connector may be arranged such that the power connector is (automatically) connected (electrically) as the attachment device attaches the power unit to a bike (mechanically). The attachment device and power connector may be arranged such that the power connector connects the power unit to an electric motor on the bike as the attachment device attaches the power unit to a bike. The attachment device and power connector may be arranged such that the power connector is connected as the attachment device is connected to a bike comprising a motor connector. The attachment device and power connector may be arranged such that the power connector is connected to a motor connector as the attachment device is connected to a mount attached to a bike. The attachment device and power connector may be arranged such that the power connector is connected to a corresponding motor connector in a mount, as the attachment device engages the mount.

Similarly, the attachment device and power connector may be arranged such that they disengage, as the attachment device disengages the mount, in a similar manner as described above, except in reverse.

The power connector may be recessed with respect to a surface of the attachment device, such that the power connector is protected and cannot be accidentally touched (e.g. short circuited) during transport of the attachment device.

The input device connector may be integral with the mount. A plurality of input device connectors may be integral with the mount.

The mount and input device connector may be arranged such that the (or each) input device connector is (automatically) connected to the control connector as the mount and attachment device engage. The mount and input device connector may be arranged such that the input device connector is (automatically) disconnected from the control connector as the mount and attachment device disengage.

The input device connector may be recessed with respect to a surface of the mount, such that the input device connector is protected and cannot be accidentally touched during transport or installation of the mount.

The control connector may be integral with the attachment device. A plurality of control connectors may be integral with the attachment device.

The attachment device and control connector may be arranged such that the control connector is (automatically) connected (electrically) as the attachment device attaches the power unit to a bike (mechanically). The attachment device and control connector may be arranged such that he control connector connects an input device (e.g. on the bike) to the power unit as the attachment device attaches the power unit to a bike. The attachment device and control connector may be arranged such that the control connector is connected as the attachment device is connected to a bike comprising an input device connector. The attachment device and control connector may be arranged such that the control connector is connected to an input device connector as the attachment device is connected to a mount attached to a bike. The attachment device and control connector may be arranged such that the control connector is connected to a corresponding input device connector in a mount, as the attachment device engages the mount.

Similarly, the attachment device and control connector may be arranged such that they disengage, as the attachment device disengages the mount, in a similar manner as described above, except in reverse.

The control connector may be recessed with respect to a surface of the attachment device, such that the control connector is protected and cannot be accidentally touched (or short circuited) during transport of the attachment device.

The mechanical and electrical connections may be simultaneous.

The attachment device and power and/or control connectors may be arranged to provide simultaneous mechanical and electrical connections between the power unit and the rest of an electric drive system for a bike. The mount and motor and/or input device connectors may be arranged to provide simultaneous mechanical and electrical connections between the power unit and the rest of an electric drive system for a bike.

As discussed above, the power connector and control connector(s) may be combined in a single electrical connector/contact. Similarly, the motor connector and input device connector(s) may be combined into a single electrical connector/contact.

When the power connector and control connector are integral with the attachment device, and/or when the motor connector and input device connector are integral with the mount, there may be only a single physical connector in each of the attachment device and mount respectively. This single connector may provide the function and be construed as both the power connector and one or multiple control connectors, and the motor connector and one or multiple input device connectors.

Thus, the attachment device and mount may be configured to provide electrical connections between the power unit and the rest of an electric drive system for a bike.

This may allow a power unit to be fully connected to the rest of an electric drive system for a bike in a single motion or action of the user. This may be extremely quick and convenient.

For the attachment device and mount to provide simultaneous electrical and mechanical connections, the power, control, motor and/or input device connectors may be wired connectors.

When any of the power, control, motor and/or input device connectors are integral with the attachment device or mount, respectively, the connectors may comprise an electrical contact. The electrical contact may be exposed to allow a connection to be made once the attachment device and mount are connected. The electrical contact may be arranged on the attachment device/mount and exposed when the attachment device is disengaged. The electrical contacts may be arranged such that they can contact a corresponding contact on the other of the attachment device/mount during engagement of the two components.

The electrical contacts may comprise pins, balls and/or spade connectors, or other forms of connection, including sprung connectors or slots or holes into which a male component is inserted. The electrical contact may be female on the mount and male on the attachment device side, or vice versa.

The electrical contact may comprise a serial port for serial data transmission. This can reduce the number of pins or electrical connections required.

The attachment device and control connector and/or power connector; and/or the mount and the input device connector and/or motor connector may be arranged such that, during connection of the attachment device/mount and the connectors, any electrical contact of the connectors is wiped by a surface of the corresponding mount/attachment device, in order to remove any oxide layer from the surface of the electrical contact.

The attachment device and/or the mount may be configured such that any electrical contacts of any connectors are aligned as the attachment device and/or mount are connected, avoiding any damage being done to the connectors.

The attachment device and/or mount may comprise a cover or shutter for shielding an electrical contact from moisture or dirt. The cover or shutter may be biased towards a shut, or protecting, arrangement. The cover or shutter may be arranged such that, when the attachment device and/or mount connects with the corresponding component, the cover or shutter is moved out of a shut arrangement against the bias in order to allow access to the electrical contact. Once the attachment device and/or mount are disconnected, the bias moves the cover or shutter back into a closed and protecting position.

The electric drive system may comprise a lock. The lock may comprise an electrically activated lock. The lock may be attachable to a bike.

The lock may comprise a locking member configured to move between a first position—a locked position; and a second position—an unlocked position. In the first position movement of the bike or movement of a wheel of the bike is restricted. In the second position the bike and the wheels thereof can move freely. The locking member may be fixable relative to the frame of the bike. The locking member may be arranged to extend to a first position, in which the locking member is threaded through the spokes of a wheel, and retract to a position in which it no longer extends through the spokes of the wheel.

The lock may be an input device. The lock may be connectable to the power unit by means of a control connector.

The lock may comprise a receiver (either wired or wireless) to receive a locking instruction and/or unlocking instruction. The control module may be configured to send a locking and/or unlocking instruction to the lock. The receiver may be an input device, also capable of communicating data with the control module regarding the lock status.

The electric drive system may be configured such that the lock is in the second position when the power unit is connected to the rest of the electric drive system and the lock is in a first position when the power unit is disconnected from the rest of the electric drive system.

The electric drive system may be configured such that the lock is moved from the first position to the second position when any one of the following occurs: the power unit is connected to the (rest of the) electric drive system; the power unit is connected to the bike; the power unit is connected to the electric motor; the power unit is connected to the input device; the power unit is connected to a user interface; the power unit is connected to a user device; the user inputs a command to the control module using a user interface, the attachment device is attached to the bike; or the attachment device is attached to the mount. The electric drive system and/or the lock may be configured such that the lock moves from the second position to the first position in the absence of one of the above conditions.

The control module may be configured to cause the lock to move from the first position to the second position when the power unit is attached unit to a bike (e.g. the mount).

The power unit may comprise an immobilisation module. The immobilisation module may be connected to the control module.

The electric drive system may comprise an immobilisation module. The immobilisation module may be an input device and may be separably connectable to the control module by means of a control connector.

The immobilisation module may comprise a key and a verifier. The immobilisation module may be configured to disable the power unit e.g. by preventing power being transferred to the electric motor, when the key is not within a predetermined proximity of the verifier. In this manner the immobilisation module can "lock" or "disable" the power unit when the key is not present.

The immobilisation module may be configured to communicate with the control module, whereby the control module prevents power being output by the power supply/power unit, or prevents the electric motor from operating, when the key is not within a predetermined proximity of the verifier.

The predetermined proximity or distance may be 5 mm, 10 mm, 20 mm, 30 mm, 50 mm, 100 mm, 1 m or 2 m.

The key may activate the verifier when it is within a certain distance of the verifier. The verifier may then enable the power unit.

The key and verifier may be wireless devices, using any suitable wireless system suitable for contactless verification (e.g. NFC). In this case, the key may need to be within the power unit, or the holder thereof, in order for the verified to detect its presence. Alternatively, the range may be larger (for example as provided by Bluetooth™, in which case the key may be within a user's pocked and still activate the verifier. When the key is within the required proximity to the verified, the power unit may be "unlocked" or "enabled" and may power the electric motor.

The key and verifier may alternatively require contact or mechanical interaction. For example the key may be a traditional mechanical key, or a wired electrical connection. In this case, the key may need to be inserted (and optionally rotated) inside of the verifier for the verifier to "unlock" or "enable" the power unit.

The immobilisation module may be configured to activate the lock when the key is not within a predetermined proximity of the verifier and thus move the lock into, or keep the lock in, a first (locked) position. The immobilisation unit may therefore be configured to deactivate the power unit and lock the bike when the key is not within a certain distance of the verifier.

The control module may be configured to move the lock from the first position to the second position when the key enters the predetermined proximity of the verifier. The control module may be configured to move the lock from the second position to the first position when the key leaves the predetermined proximity of the verifier.

The power unit may comprise a charge interface to facilitate charging of the power unit, i.e. power supply. The charge interface may comprise a charge connector for connecting the power supply to a power source for charging the power supply. The charge interface may comprise a mains plug for connecting the power supply of the power unit to a mains power supply. The charge interface may be suitable for charging by AC or DC. The charge interface may comprise separate connectors for AC and DC charging. The mains plug may comprise folding pins to minimise its size.

The charge interface may comprise an extension cable of a length of 1 m, 2 m, 3 m, 4 m, 5 m or more than 5 metres, for enabling a power unit connected to a bike to be conveniently charged by a mains power supply. This extension cable may be retractable, for which there may be a mechanism for retraction within the bag. Alternatively there may be a plug or cable/lead mechanism in the bag, e.g. a kettle lead.

The charge interface, although it may comprise a kettle female connector and lead integrated into the bag, it may instead be a USB type charging connector, such as the USB type C connector. Both forms of cable are readily available and familiar to users.

The charging interface may also comprise a charging plinth/connector for the bag. It can be integral with, or perhaps similarly shaped to, conventional a handlebar mount mechanism. It could thus allow the power supply to charge via already existing connectors.

The charging interface could even include wireless charging capability, such as through the use of inductive charging.

The charge interface, or power unit, may even comprise a solar panel. The solar panel may be configured to charge the power supply. The solar panel may be integral with, or attached to, a surface of the holder. The solar panel may be attached to the top of the holder, which may be a bag.

The power unit may comprise an external power connector for powering an external device, such as a user device. The external power connector may be configured to connect an external device to the power unit such that the power unit can supply power to the external device. Example external devices may include a phone, camera, laptop, tablet, gaming device, music speakers, fan etc.

The external power connector may be connected to, or integral with, the control module, user interface or holder.

The external power connector may be for providing AC or DC power. The external power connector may comprise a USB connector, a micro USB connector, a mains power connector, a 12V DC connector or any other commercially available connector. This external power connector may be in addition to the power output for powering an electric motor connected to a bike. The external may comprise a male and/or female connector.

Further according to an embodiment of the present disclosure is a bike comprising an electric drive system or a power unit as described anywhere herein.

Further according to an embodiment of the present disclosure is a method for adapting a non-electric bike into an electric powered bike, the method comprising: installing an electric motor (for example as described anywhere herein) on the bike and installing an input device (for example as described anywhere herein) on the bike. The method may further comprise attaching a power unit as described anywhere herein to the bike and connecting the power unit to the electric motor and input device.

According to a further embodiment of the present disclosure is an attachment device configured to attach a portable power unit to an electric drive system for a bike. The attachment device may be as described anywhere herein.

According to a further embodiment is an apparatus for connecting a portable power unit to an electric drive system of a bike. The apparatus may comprise an attachment device as described anywhere herein and a mount as described anywhere herein.

These and other preferred features of the present invention will now be described in further detail with reference to the accompanying drawings.

Figure 1:
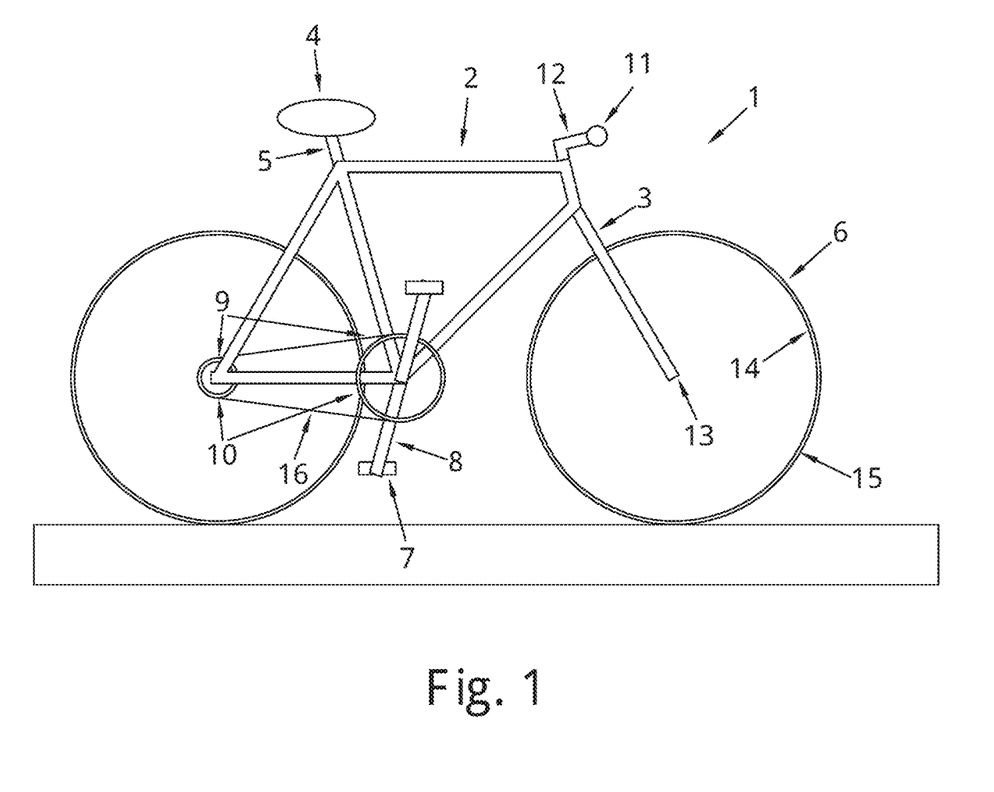
FIG. 1 is a side view of a push bike.

FIG. 1 shows a push bike 1 according to the prior art. The bike depicted comprises a frame 2, a seat post 5 and saddle 4, a stem 12 and handle bars 11, a front fork 3, two bicycle wheels 6 with hubs 13, rims 14 and tires 15. The wheels are attached to the frame 2 with axles. The bike also has a gearing system 9, shown as a chain 16, chain rings 10 and cog set. The bicycle has two pedals 7 connected to a crank arm 8, the pedals 7 form the mechanical interface between the users foot and the crank arm 8. It is to be understood that the illustrated bike is an example only and embodiments according to the present disclosure can be used with any bike or similar product.

Figure 2:
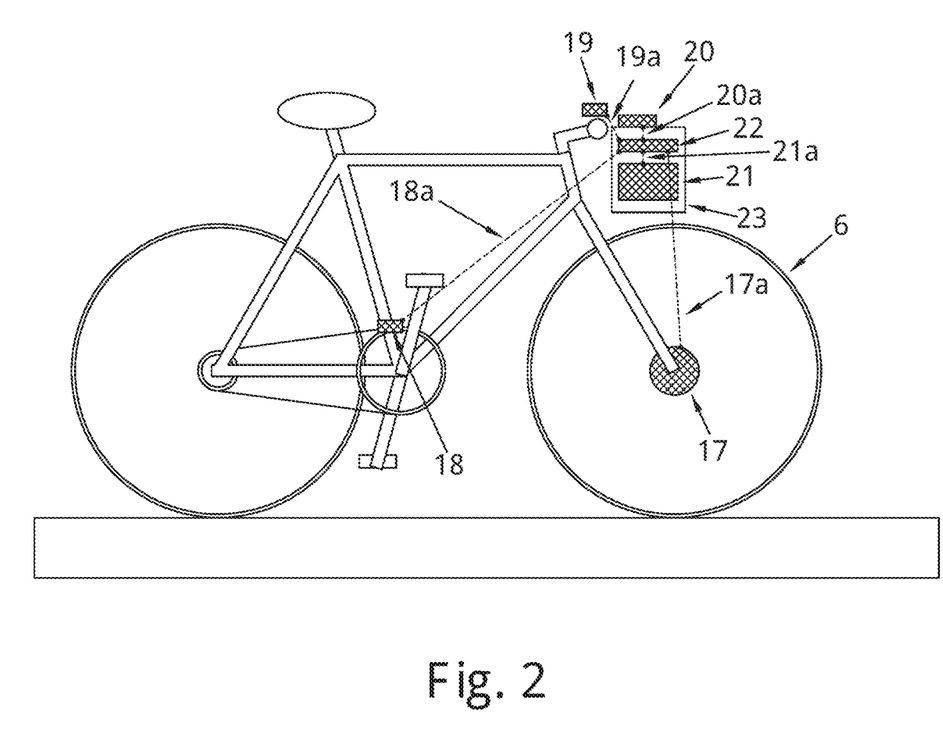
FIG. 2 is a side view of a push bike with an embodiment according to the present disclosure.

FIG. 2 depicts a push bike 1 with an electric drive system according to an embodiment. In FIG. 2, the push bike 1 has been modified to have a pedal assist sensor 18 and electric motor 17. The electric motor 17 is a hub motor for mounting on the hub 13a of the front wheel 6a, however, in other embodiments it is possible that the motor could be a mid-drive motor, for mounting around the crank arm 8.

Also shown in FIG. 2 is a power unit. The power unit has a holder in the form of a bag 23, which contains a control module 22, a power supply 21 (in the form of a battery) and a user interface 20. The user interface 20 is visible to the user and contains a display. In this embodiment, the user interface 20 is attached to the top surface of the bag 23.

The user interface 20 may be used to provide information or feedback to the user—for example a speed of the bike or the power level of the power supply 21. The user interface 20 may also be used as an input device to allow a user to manage settings—for example the power level supplied to the motor (i.e. a throttle) or to turn on or off an electric light.

The power supply 21 and user interface 20 are connected to the control module 22 by connectors 21a and 20a respectively. In the present embodiment, these connections are permanently in place, for example they may be hard wired connections, which are part of an integrated circuit. In alternative embodiments, however, they may be flexible connectors with attachable and detachable connection ends.

The power unit has connectors for connecting the other devices of the electric drive system. In the present embodiment, the control module 22 has control connectors for connecting the following input devices: pedal assist sensor 18 and brake detectors 19. These connectors in the present embodiment are in the form of sockets/ports on the bag 23.

The control module 22 also has a power connector for connecting the power unit to the electric motor 17. This power connector is also in the form of a socket/port on the bag 23 in the present embodiment.

The pedal assist sensor 18 is connected to the control module 22 by an input device connector 18a, which plugs into a control connector on the bag 23. Electric motor 17 is connected to the control module 22 by a motor connector 17a which plugs into the power connector on the bag 23. Brake detectors 19 are attached to the handle bars 11 and connected to the control module 22 by an input device connector 19a which plugs into a control connector on the bag 23. In this embodiment the input device and motor connectors 17a, 18a and 19a are fixed with respect to the bike permanently, although in other embodiments they may be separable from the bike.

The bag 23 is attachable to and detachable from the push-bike 1. The bag 23 is attached to the handle bars 11 by an attachment device (not shown) and positioned such that the user can connect the motor connector 17a to the power unit via the power connector and input device connectors 18a and 19a to the power unit via the control connectors. This connects the motor 17 and input devices to the rest of the electric drive system for the bike, such that power can be supplied from the power supply 21 to the electric motor 17 and the control module can communicate with the pedal assist sensor 18 and brake detectors 19 on the bike in order to manage the power supply. When the user attaches the bag 23 to the bike 1, the user also connects the connectors 17a, 18a and 19a to the relevant input on the power unit/control module.

The connectors are physical in this embodiment, i.e. the connectors 18a, 17a, 19a connecting the brake detectors 19, pedal assist sensor and electric motor with the control module 22 are wired connectors. The motor connector 17a is a power cable which connects the electric motor 17 to a plug/socket and is conveniently located for connection with the power unit.

The control connectors and power connectors (and/or motor and input device connectors) may be identical connectors, or may be different types of connector. The power connector may be any standard AC or DC power connector, as described above. The power connector and/or control connector may comprise any standard power/data cable, such as USB, micro USB or any other examples mentioned above.

To install the drive system, the pedal assist sensor 18, brake detectors 19 and electric motor 17 are installed on a standard non-electric push bike. The connectors (e.g. cables and connecting ends) are then connected to the pedal assist sensor 18, brake detectors 19 and electric motor and are attached to the bike frame. For example, they may be attached (e.g. by clamps) to members of the triangular central frame or the front forks, such that their ends are conveniently located for connecting to a power unit.

When a user wants to use the electric drive system on the bike, they simply need to attach the power unit—embodied within a self-contained bag—to the bike mechanically, and then connect the connectors to the relevant inputs on the power unit. The electric drive system is then ready for use.

During use, a user can start to use the pedals, as they usually would. The pedal assist sensor 18 detects the use of the pedals and communicates this to the power unit (control module 22). The control module controls the power supply 21 such that power is supplied from the power unit to the electric motor 17 and the electric motor 17 assists in driving the bike.

The user interface 20 may comprise a throttle control, or may be configured to act as a throttle control, allowing a user to vary the power supplied to, or by, the electric motor 17. This may allow a user to adjust the speed of the bike when electrically powered.

When a user brakes, the brake detectors 19 communicate this to the power unit (control module 22). The control module 22 may be configured to reduce, or cut off, power supply from the power unit to the electric motor 17, or the power output from the electric motor in order to ensure that the electric motor 17 is not trying to drive the bike forwards when the user wants to brake.

Figure 3:
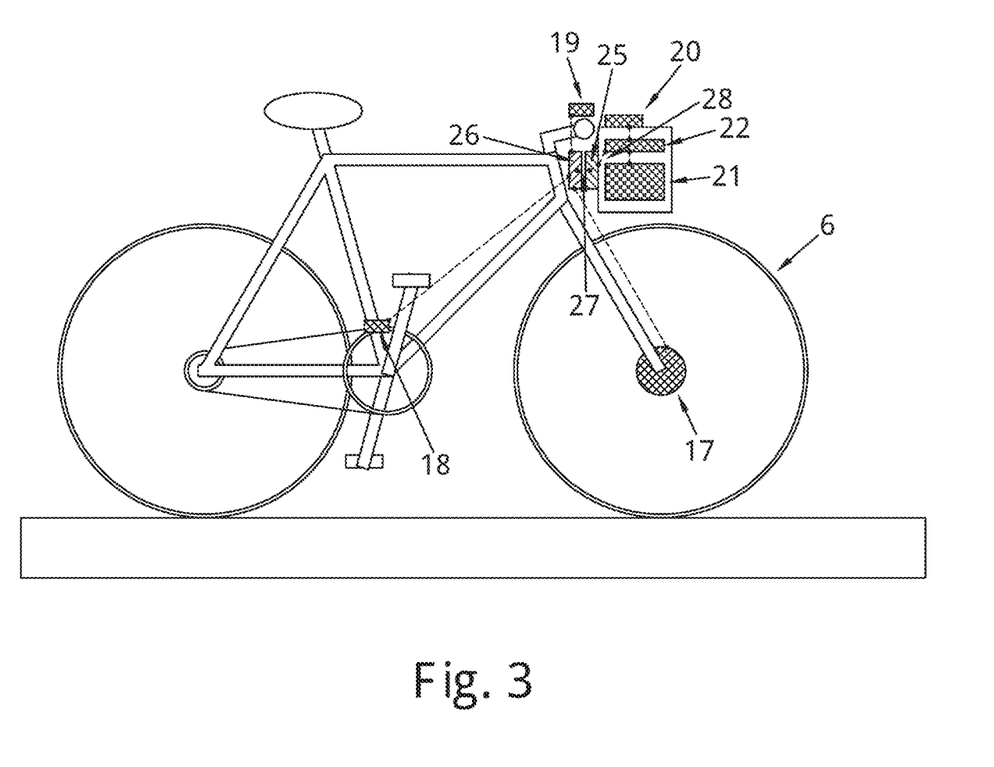
FIG. 3 is a side view of a push bike with a further embodiment according to the present disclosure.

FIG. 3 shows a further embodiment according to the present invention. The electric drive system in FIG. 3 has a mount 26. The detachable power unit in this embodiment comprises a bag 23 with an attachment device 25. In this embodiment the mount 26 and attachment device 25 form a single connection point 27. Mount 26 and the attachment device 25 are arranged to mechanically connect and are configured to be releasably engageable.

Furthermore, the mount 26 and attachment device 25 are configured to provide electrical power and/or data connections between the power unit and the rest of the electric drive system (e.g. the input devices and electric motor). This is achieved by integrating the motor connector(s) and input device connector(s) in the mount, and the power connector (s) and control connector(s) in the attachment device. As such, when a user attaches the power unit to a bike by mechanically attaching the attachment device 25 and the mount 26, the electrical power and/or data connections between the motor and power connectors and input device and control connectors are automatically, simultaneously, made.

Mount 26 is attached to all three connectors 17a, 18a and 19a, which may optionally join to form a single electrical connection in the mount. These are integral to the mount 26.

In this embodiment 17a, 18a and 19a are physical connectors, permanently attached to the mount 26. Since these connectors 17a, 18a and 19a are fixed to the mount 26, which is fixed to the bike 1, the user does not need to wire the electronics separately, which is advantageous. The attachment device 25 comprises control connectors for the brake detectors 19 and pedal assist sensor 18 and a power connector for the electric motor. In this embodiment, the control connectors and power connector are combined into a single power and data connector 28.

The mount 26 and attachment device 25 are arranged such that a single connection point 27 is (automatically) made between the mount 26 and attachment device 25. And that the control module 22 is connected to the attachment device 25 via a single connector 28 of the power unit which acts as the control connector and power connector. The electrical power and data connection is made between the power unit and the input devices and electric motor 17 as the mount 26 and attachment device 25 engage. Similarly, the connection can be severed when the mount 26 and attachment device 25 are disengaged, i.e. the bag is detached from the bike.

In this way the attachment device 25 and mount 26 are arranged such that a single electrical connection 27 is (automatically) connected (electrically) as the attachment device 25 attaches the unit to a bike (mechanically).

In some embodiments, the electrical/data connections may be made using exposed contacts arranged to connect with corresponding contacts/brushes/protrusions upon mechanical connection. An example of a suitable type of connection (providing mechanical and electrical connections simultaneously) is that used in a cordless drill between the power supply and the drill—the power pack is inserted into the handle of the drill and automatically provides a mechanical and electrical connection.

In other embodiments, the simultaneous mechanical and electrical connection may be provided by using standard electrical connectors (e.g. standard 12V DC connectors), specifically arranged such that they connect as part of the same motion as that which connects the mechanical fastening elements of the mount and attachment device.

Once a connection is made between the mount and attachment device, power can be supplied from the power supply 21 to the electric motor 17 and the control module 22 can communicate with the pedal assist sensor 18 and brake detectors 19 on the bike in order to manage the power supply.

Figure 4:
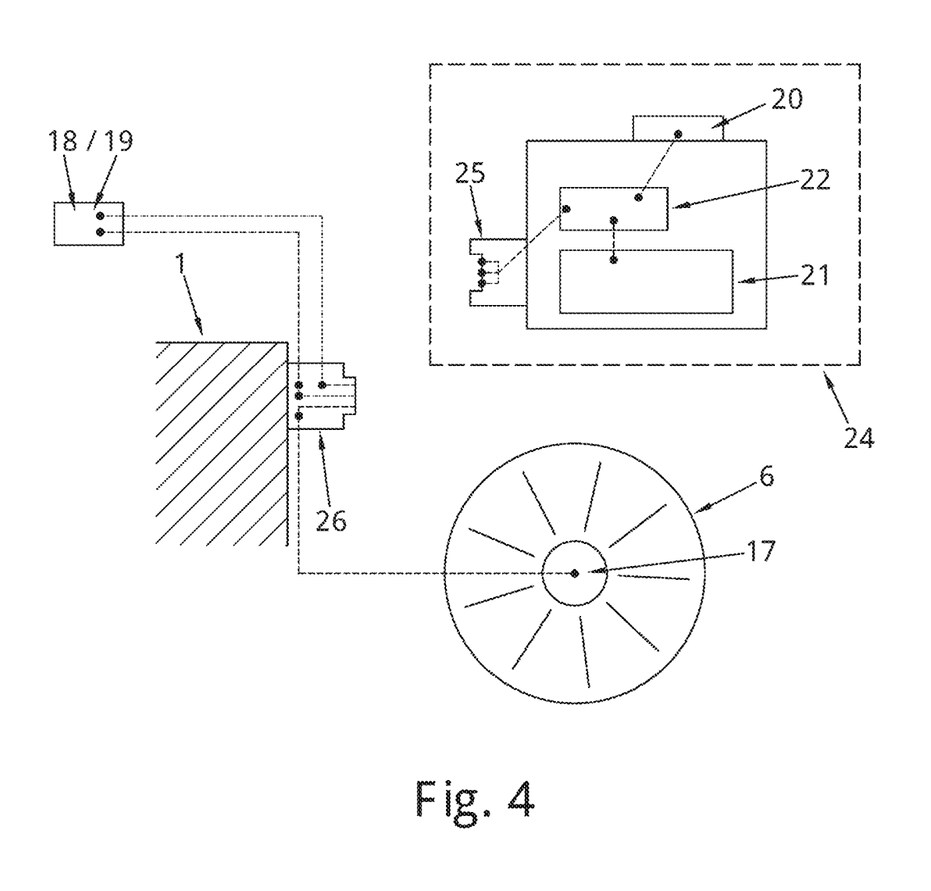
FIG. 4 is a schematic of a mount and a detachable unit in accordance with an embodiment of the present disclosure.

FIG. 4 schematically illustrates an embodiment according to the present disclosure. The detachable power unit 24, comprising bag 23 and contents: user interface 20, control module 22, power supply 21; and attachment device 25. The attachment device 25 and mount 26 comprise a mechanical connector arranged to cooperate with a corresponding mechanical connector on the other of the attachment device 25 and mount 26. The attachment device 25 comprises a locking mechanism which is shown here as a receiving recess, whereby the detachable power unit 24 is secured to the bike 1. The attachment device 25 is configured to be actuated to unlock the locking mechanism so that the attachment device 25 can be detached from a bike 1.

The mount 26, electric motor connector 17a, pedal assist sensor connector 18a and brake detector connector 19a are arranged such that simultaneous mechanical and electrical connections are provided between the detachable unit 24 and the rest of an electric drive system for a bike 1. This is achieved by the connectors being integral with the attachment device and mount.

Figure 5:
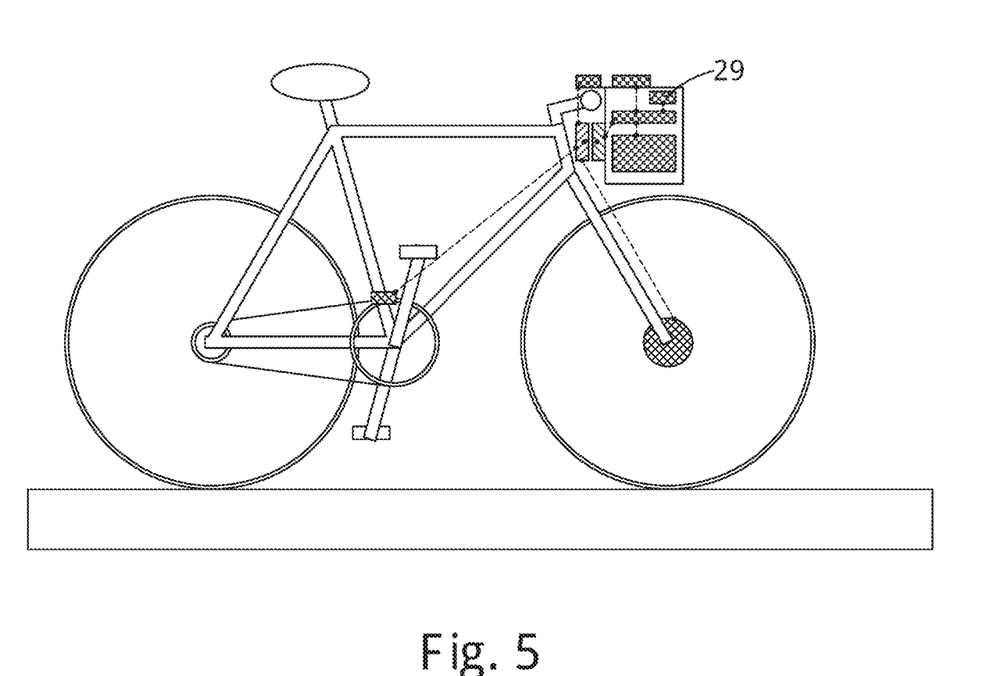
FIG. 5 is a side view of a push bike with an embodiment of the present disclosure.
Figure 6:
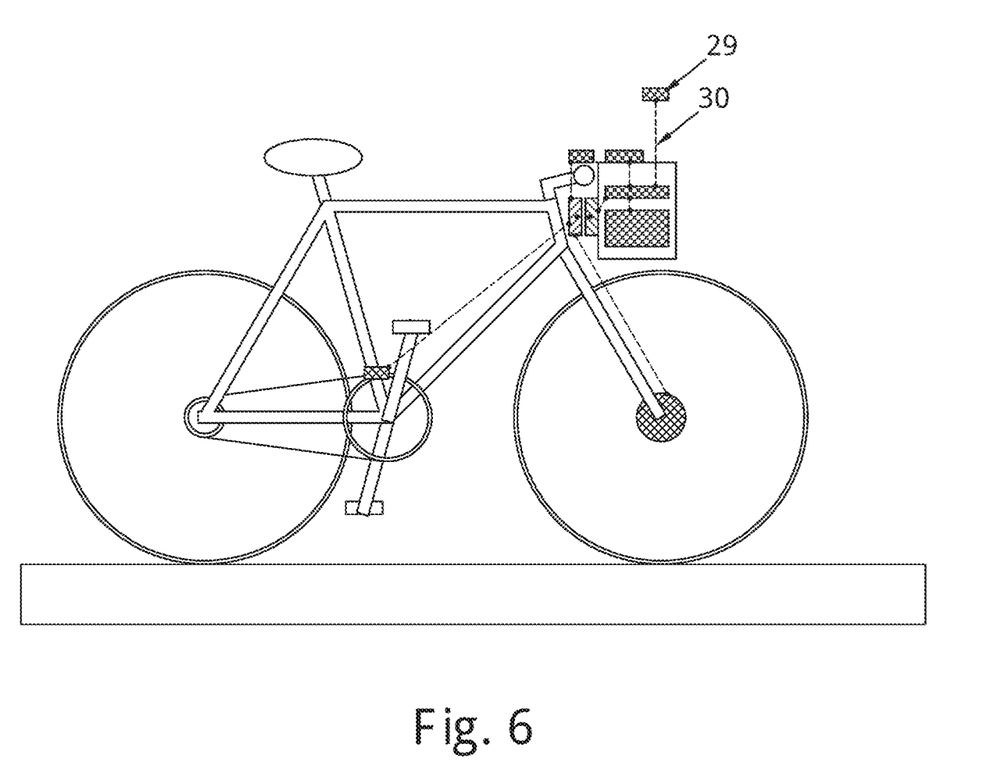
FIG. 6 is a further side view of the push bike of FIG. 5.

FIG. 5 and FIG. 6 show an embodiment of the present invention in which the power unit comprises, in addition to the features described in FIG. 3, a mains plug for charging the power supply 21. In FIG. 5 the mains plug 29 is integrated with the detachable power unit 24 and is in a non-extended state such that it is contained within the bag 23. The mains plug 29 is provided as part of a charge interface to facilitate charging of the power supply 21 by connecting the power supply 21 to a mains power supply.

In FIG. 6 the mains plug 29 is extended ready to be connected to a mains power supply and so is depicted outside of the detachable power unit 24 and is connected to the detachable unit 24 by a charging cable 30. The charge interface in this case also comprises the extension cable 30 for enabling a power supply 21 connected to a bike to be conveniently charged by a mains power supply.

While certain embodiments have been described, these embodiments have been presented by way of example only, and are not intended to limit the scope of the invention. Indeed, the novel methods, devices and systems described herein may be embodied in a variety of forms; furthermore, various omissions, substitutions and changes in the form of the methods and systems described herein may be made. The accompanying claims and their equivalents are intended to cover such forms or modifications as would fall within the scope of the invention defined by the claims.

The invention claimed is:

1. A power unit for powering an electric bike, the power unit comprising:
   a power supply;
   a control module connected to the power supply and configured to manage the power output by the power unit;
   a holder for supporting the power supply and control module;
   a power connector for connecting the power unit to an electric motor;
   a control connector for connecting the power unit to an input device; and
   an attachment device for attaching the power unit to a bike, wherein the power connector is integral with the attachment device; and
   the power connector and attachment device are arranged such that the power connector is connected as the attachment device attaches the power unit to a bike;
      wherein the power unit is configured to be mechanically and electrically connected to a bike in a single motion;
      wherein the holder is a bag comprising a refastenable opening to permit access to the inside of the bag, and the power supply and control module are both located inside the bag.

2. A power unit according to claim 1, wherein the control connector is configured to connect the power unit to a pedal sensor configured to detect when a user of a bike is pedalling.

3. A power unit according to claim 1, further comprising a user interface comprising a display and an input device for receiving inputs from a user.

4. A power unit according to claim 1, wherein the attachment device comprises:
   a locking mechanism for preventing the attachment device being unintentionally disconnected from the bike, the locking mechanism comprising:
   a release;
      wherein the release is configured to be actuated to unlock the locking mechanism so that the attachment device can be detached from a bike; and
      the holder comprises a handle, and the handle is configured to actuate the release when the handle is moved.

5. A power unit according to claim 1, wherein the power connector is a wired connector.

6. A power unit according to claim 1, wherein the control connector is a wired connector and is integral with the attachment device; and
   the control connector and attachment device are arranged such that the control connector is connected as the attachment device attaches the power unit to a bike.

7. A power unit according to claim 1, wherein the power connector and control connector are combined in a single connector.

8. A power unit according to claim 1, further comprising an immobilisation module comprising a key and a verifier;
   wherein the immobilisation module is configured to disable the power unit when the key is not within a predetermined proximity of the verifier.

9. A power unit according to claim 1, further comprising a charge interface comprising a solar panel configured to charge the power supply.

10. A power unit according to claim 1, further comprising an external power connector for powering an external device.

11. A kit of parts comprising:
    a separable power unit according to claim 1;
    an electric motor for powering a bike, wherein the electric motor is separably connectable to the power unit by means of the power connector;
    an input device for communicating data to the power unit;
    wherein the data is used to manage the power supply of the power unit and the input device is separably connectable to the power unit by means of the control connector.

12. An electric drive system for a bike, the system comprising:
    a separable power unit, wherein the power unit comprises:
    a power supply;
    a control module connected to the power supply and configured to manage the power output by the power unit;
    a holder for supporting the power supply and control module;
    a power connector for connecting the power unit to an electric motor;
    a control connector for connecting the power unit to an input device;
    an attachment device for attaching the power unit to a bike, wherein the power connector is integral with the attachment device;
    wherein, the power connector and attachment device are arranged such that the power connector is connected as the attachment device attaches the power unit to a bike;
    wherein the power unit is configured to be mechanically and electrically connected to a bike in a single motion;

an electric motor for powering a bike, wherein the electric motor is separably connectable to the power unit by means of the power connector;

an input device for communicating data to the power unit; wherein the data is used to manage the power supply of the power unit and the input device is separably connectable to the power unit by means of the control connector;

a mount, wherein the mount is attachable to a bike and is configured to releasably engage the attachment device;

a motor connector for connecting the motor to the power connector;

wherein the motor connector is integral with the mount, and the mount and motor connector are arranged such that the motor connector is connected to the power connector as the mount and attachment device engage.

13. An electric drive system according to claim 12, comprising at least one of the following input devices: a user interface, a pedal sensor configured to detect when a user is pedalling, a brake sensor for detecting when a brake is activated, a light, a user device, a throttle control configured to control a power output of the power supply and a light sensor configured to detect an ambient light level.

14. An electric drive system according to claim 12, comprising an input device connector for connecting the input device to the control connector; wherein the input device connector is integral with the mount, and the mount and input device connector are arranged such that the input device connector is connected to the control connector as the mount and attachment device engage.

15. An electric drive system according to claim 14, wherein the motor connector and input device connector are combined in a single connector in the mount.

16. An electric drive system according to claim 12, further comprising an electrically activated lock;
wherein the electric drive system is configured such that the lock is an unlocked position when the power unit is connected to the rest of the electric drive system and the lock is in a locked position when the power unit is disconnected from the rest of the electric drive system.

17. An electric drive system according to claim 16, further comprising an immobilisation module comprising a key and a verifier;
wherein the immobilisation module is configured to disable the power unit when the key is not within a predetermined proximity of the verifier; and
the immobilisation module is configured to activate the lock when the key is not within a predetermined proximity of the verifier by moving the lock into, or keeping the lock in, a locked position.

* * * * *